3,733,295
FLUOROCARBON FILLED CARBOXYNITROSO-POLYBUTADIENE VULCANIZATE

Jon W. Martin, Los Alamitos, Eugene A. Burns, Palos Verdes Peninsula, and Robert A. Meyers, Encino, Calif., assignors to TRW Inc., Redondo Beach, Calif.
No Drawing. Filed Dec. 28, 1970, Ser. No. 102,268
Int. Cl. C08f 9/08, 45/04, 45/14
U.S. Cl. 260—41.5 R                    10 Claims

ABSTRACT OF THE DISCLOSURE

A decrease in permeability and an increase in chemical resistance of carboxynitroso rubbers can be effected by the addition of small amounts of polybutadiene resins and powdered tetrafluoroethylene polymer filler. Liquid functionally terminated polybutadiene and powdered polytetrafluoroethylene are mixed into a terpolymer containing trifluoronitrosomethane, tetrafluoroethylene, and a small amount of nitrosoperfluorobutyric acid. The mixture is cured in the presence of a peroxide free radical intiator.

---

The invention herein described was made in the course of or under a contract or subcontract thereunder with the Department of Defense.

Carboxynitroso rubber is substantially a blend of equal amounts trifluoronitrosomethane and tetrafluoroethylene and a small amount of 4-nitrosoperfluorobutyric acid. Various additive compounds such as chromium trifluoroacetate or dicyclopentadiene dioxide are incorporated to improve final properties. Because of the highly fluorinated materials making up the elastomer, excellent chemical and thermal properties are exhibited. The outstanding chemical resistance of the rubber is best illustrated by its compatibility with nitrogen tetroxide, fuming nitric acid, aromatic or aliphatic solvents, oils, acid or bases, while its failure to ignite or burn in an atmosphere of 100% oxygen is a clear demonstration of its thermal stability. In addition to its attractive chemical and thermal properties, it has the physical characteristics of a synthetic rubber over a temperature range of from about −40° C. to about +200° C.

Although carboxynitroso rubber exhibits chemical resistance properties far exceeding those of other rubbers, it has been discovered that the chemical resistance can be significantly improved and the permeability can be greatly decreased by the addition of small amounts of functionally terminated polybutadiene and powdered polytetrafluoroethylene filler. More specifically, the small amount of 4-nitrosoperfluorobutyric acid added to carboxynitroso gum stock renders the gum stock capable of reaction with a functionally terminated polybutadiene, and the powdered polytetrafluoroethylene greatly reduces the permeability and enhances the tear strength of the rubber product. The 4-nitrosoperfluorobutyric acid is added in amounts ranging from about 0.25 mole percent to about 8 mole percent with the preferred amount being about 1 mole percent Commensurately, the amount of trifluoronitrosomethane ranges from about 42 mole percent to about 49.85 mole percent with the preferred being about 49 mole percent. The tetrafluoroethylene component is constant at 50 mole percent.

The functionally terminated polybutadiene may be selected from amino terminated polybutadiene mercapto terminated polybutadiene, commercially available hydroxy terminated polybutadiene or from isocyanate terminated polybutadiene. The isocyanate terminated polybutadiene can be prepared by reacting commercially available hydroxy terminated polybutadiene with twice the molar equivalent of a diisocyanate to produce an isocyanate terminated polybutadiene. Because of the reactive isocyanate groups on the polybutadiene, the liquid material should be sealed from moisture and used within a brief time after preparation.

Although microstructure and molecular weight of the polybutadienes used is immaterial, it is preferred that the molecular weights range between about 500 to 5000 and the olefinic unsaturation comprise about 60% or greater vinyl groups. Polybutadiene having a 60% or greater 1,2-microstructure exhibits faster cures and more consumption of the unsaturation during final cure. It should be recognized that the amount of polybutadiene and peroxide used, as well as the unsaturated micro-structure can affect the mechanical properties of the resultant vulcanizate.

Suitable diisocyanates may be selected from the following:

TABLE I 2,4-tolylene diisocyanate
2,6-tolylene diisocyanate
hexamethylene diisocyanate
trimethylene diisocyanate
pentamethylene diisocyanate
1,4-benzene diisocyanate
butylene 1,2-diisocyanate
butylene 1,4-diisocyanate After preparation of the carboxynitroso rubber terpolymer, the functionally terminated polybutadiene is mixed on a rubber mill with the terpolymer in an amount which is approximately stoichiometric with the 4-nitrosoperfluorobutyric acid. After the components are mixed thoroughly on the rubber mill, the mixed gum stock is sheeted off and placed in an oven for about 16–18 hours at temperatures from room temperature to about 110° C. An intermediate elastomer which is believed to be chains of the carboxynitroso terpolymer crosslinked by the polybutadiene is formed by this treatment.

After the terpolymer and the polybutadiene have been milled and reacted, the elastomeric intermediate is returned to the rubber mill to add peroxides and fillers. The peroxide can be incorporated either into the functionally terminated polybutadiene prior to mixing with the terpolymer, or it can be added after the terpolymer and the polybutadiene have been reacted to form the intermediate elastomer. Although either step works satisfactorily, there are certain inherent advantages which can be considered with each approach. In one instance, because the peroxide tends to attack fluorine groups on the terpolymer which react with the hydrogen from the polybutadiene to generate hydrogen fluoride, it may be desirable to add the peroxide as late in the processing as possible to minimize the contact of the peroxide with the terpolymer. In the other instance, the peroxide is intended to cure only the polybutadiene, and therefore, to insure that the peroxide and polybutadiene come into intimate contact, it may be desirable to add the peroxide to the polybutadiene prior to milling with the terpolymer. Either way the peroxide may be added in amounts ranging from 0.1% to approximately 20% by weight based on the amount of the polybutadiene used, with about 5% by weight preferred.

Some of the suitable peroxide free radical initiators are as follows:

TABLE II di-t-butyl peroxide
dicumyl peroxide
decanoyl peroxide
methyl ethyl ketone peroxide
2,5-dimethyl-2,5-di(t-butyl peroxy) hexane
lauroyl peroxide
acetyl peroxide
cumene hydroperoxide
t-butyl perbenzoate Because carboxynitroso rubber is an amorphous polymer and has a low strength even when cured, reinforcing fillers are added to improve the product properties. Polar reinforcing fillers such as silicon dioxide increase significantly the strength of carboxynitroso rubber, but also provide a high gas permeability. It has been discovered that powdered polytetrafluoroethylene reinforces carboxynitroso rubber and substantially decreases the gas permeability of the resulting carboxynitroso composite. Polytetrafluoroethylene and carboxynitroso rubber are both perfluorinated polymers and are therefore mutually compatible and resistant to the same types of chemicals, for example strong oxidizers such as nitrogen tetroxide.

The powdered polytetrafluoroethylene should have a particle size ranging from particles small enough to disperse and large enough to shear. Typically, particle sizes may range from about 25 microns to about 400 microns and the amounts of these particles may range from 1% to 75% by weight.

Other reinforcing fillers, such as lithium fluoride, calcium fluoride, ferric fluoride, titanium fluoride, silicon dioxide, titanium dioxide, and magnesium fluoride, can be added to the carboxynitroso rubber concurrently with the powdered polytetrafluoroethylene. Amounts of from 1% to about 50% by volume can be used, however, while the inorganic salt reinforcing fillers increase the strength of the rubber product, they also tend to increase the permeability of the rubber.

Because there is the inevitable decomposition of small amounts of the fluorinated polymers under conditions used in processing, it is necessary to add an alkaline earth salt acid acceptor to the polymer mix. This acid acceptor reacts with the evolved hydrogen fluoride to prevent corrosion of the mold and bubbling in the molded part. Approximately 1% to 25% by weight of acid acceptor can be used in the formulation of the rubber with beneficial results, and the reinforcing filler material can be reduced proportionally if it is desired to keep the amount of filler below a predetermined maximum.

Suitable acid acceptors may be selected from the following:

TABLE III magnesium oxide
calcium oxide
strontium oxide
barium oxide

Final cure of the elastomeric intermediate is effected in a mold made of material inert to reaction with the evolved hydrogen fluoride. Suitable mold materials can be selected from stainless steel, polytetrafluoroethylene coated metal, or chromium plated metal.

Cure conditions may range from about 30 minutes at about 90° C. to about 150° C. Higher cure temperatures, viz, around 200° C., tend to decompose the constituents in the intermediate elastomer and produce bubbles. If upgrading of the final properties is desired, a 24 hour post cure at about 90° C. will make the polymer more compatible with severely oxidizing chemicals.

Although the final product does not lend itself to analysis of the chemical structure readily, it is hypothesized that the carboxynitroso rubber perfluorobutyric acid terpolymer and polybutadiene react in the following ways:

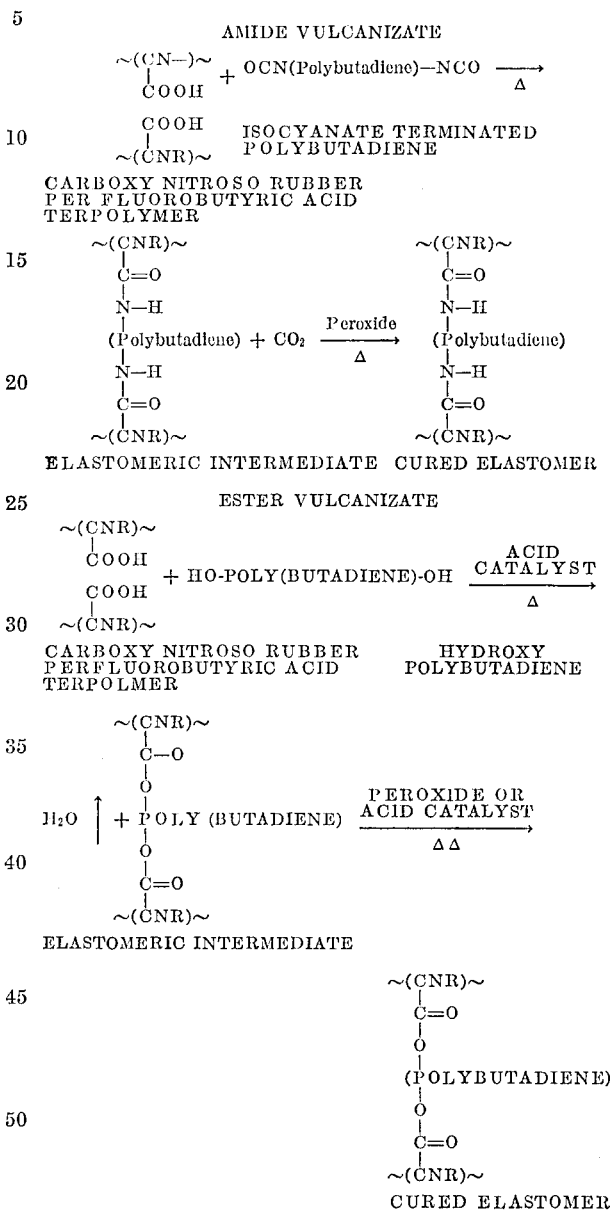

It is believed that the functional groups on the polybutadiene react with the acid group of the perfluorobutyric acid to form very long flexible crosslinks which will permit carbon dioxide or water to escape the matrix readily upon heating. The subsequent cure at elevated temperatures forms a tight crosslink which encircles the carboxynitroso rubber carbonyl site with a highly resistant hydrocarbon structure and closes the matrix to produce a more impermeable rubber. Thus, the polybutadiene matrix not only decreases permeability but also protects the amide or ester linkage at the crosslink origin.

The following examples illustrate the effect various formulations have on the properties of carboxynitroso rubber.

EXAMPLE I

100% carboxynitroso rubber

Approximately 100 grams of carboxynitroso gum stock were placed in a fluorocarbon liquid to remove low molecular weight impurities. The carboxynitroso gum stock was extracted and fed into a rubber mill where it was worked until it banded. The gum stock was sheeted off and cut. The sheet was molded at 5000 p.s.i. for 15 minutes at 120° C., 15 minutes at 150° C., and 15 minutes at 175° C.

EXAMPLE II

Inorganic salt filled carboxynitroso rubber

Approximately 100 grams of carboxynitroso gum stock was extracted and banded by the procedures set forth in Example I, supra. Approximately 25 grams of silicone oil coated silicon dioxide particles and approximately 6 grams of chromium trifluoroacetate were added to the gum stock which was returned to the rubber mill cross cut several times and end rolled. The gum stock was sheeted off and molded for 30 minutes at 107° C. under 5000 p.s.i. applied pressure, followed by heating sequentially in ovens for 1 hour at 93° C., 2 hours at 107° C., 2 hours at 121° C., 1 hour at 135° C., and 1 hour at 149° C.

EXAMPLE III

Inorganic salt filled carboxynitroso-polybutadiene vulcanizate

Approximately 100 grams of carboxynitroso gum stock was extracted and banded by the procedures set forth in Example I. Approximately 16 grams of polybutadiene diisocyanate, molecular weight about 2000, was poured onto the mill, crosscut several times, and end rolled. The gum stock mixture was sheeted off then and placed in an oven for about 18 hours at about 65° C. to form an intermediate elastomer. The intermediate elastomer was removed from the oven and returned to the rubber mill where 25 grams of finely divided silicon dioxide particles, 5 grams of powdered magnesium oxide, and 0.6 gram of dicumyl peroxide were added to the intermediate elastomer. The filled elastomer was again cross cut several times and end rolled. Prior to sheeting off the elastomer the mill was opened to give a sheet slightly thicker than the mold to be used. The filled elastomer sheet was cut and placed in the mold at 5000 p.s.i. to cure for 15 minutes at 120° C., 15 minutes at 150° C. and 5 minutes at 175° C.

EXAMPLE IV

Polytetrafluoroethylene filled carboxynitroso-polybutadiene vulcanizate

Approximately 100 grams of carboxynitroso gum stock was extracted and banded by the procedure set forth in Example I. Approximately 8.5 grams of polybutadiene diisocyanate, molecular weight about 2000, was poured onto the mill, cross cut several times, and end rolled. The gum stock was sheeted off and placed in an oven for about 18 hours at about 65° C. to form an intermediate elastomer. The intermediate elastomer was removed from the oven and returned to the rubber mill where 25 grams of powdered polytetrafluoroethylene, about 350 micron average particle size, 5 grams of powdered magnesium oxide, and 0.5 gram of dicumyl peroxide were added to the intermediate elastomer. The filled elastomer was crosscut several times and end rolled again. Prior to sheeting off, the mill was opened to give a sheet slightly thicker than the mold to be used. The filled elastomer sheet was cut and placed in the mold at 5000 p.s.i., to cure for 5 minutes at 150° C. and 30 minutes at 175° C.

The following table shows a comparison of the properties of the examples. An absolute comparison of the data is not possible because different lots of carboxynitroso rubber were used and the cure conditions in each example are not identical. Approximate relative strength can be obtained by comparing the product of the tensile strength times the percent elongation (TXE) of the examples.

TABLE IV

| Example number | Properties | | | |
|---|---|---|---|---|
| | Tensile, p.s.i. | Elongation, percent | TXE [1] | $N_2O_4$ permeability mg./cm.[2]-hr.[2] |
| 1 | 100 | 200 | 2 | Not tested. |
| 2 | 745 | 550 | 41 | 28.0 |
| 3 | 2,025 | 510 | 104 | 4.10 |
| 4 | 950 | 550 | 52 | 0.0032 |

[1] Product value (X10⁻⁴) of tensile strength times elongation at break.
[2] 0.950-inch thick samples.

From the data in Table IV, it can be seen readily that the addition of powdered polytetrafluoroethylene and polybutadiene greatly reduces the permeability of carboxynitroso rubber (Example 4) when compared to carboxynitroso rubber filled with an inorganic salt (Example 2) or to carboxynitroso rubber filled with polybutadiene and finely divided silicon dioxide particles (Example 3). A comparison of Examples 3 and 4 shows poorer mechanical properties for polytetrafluoroethylene filled carboxynitrosopolybutadiene vulcanizates than for silica filled, however, these properties can be improved somewhat by increasing the amount of polybutadiene or adding small amounts of the inorganic filler salts.

We claim:
1. A filled carboxynitroso-polybutadiene vulcanizate comprising:
 (A) a terpolymer of 42 to 49.85 mole percent trifluoronitrosomethane, 50 mole percent tetrafluoroethylene, and 0.25 to 8 mole percent nitrosoperfluorobutyric acid;
 (B) a functionally terminated polybutadiene selected from the group consisting of amino termiated polybutadiene, mercapto terminated polybutadiene, hydroxy terminated polybutadiene, and isocyanate terminated polybutadiene in an amount which is stoichiometric with nitrosoperfluorobutyric acid;
 (C) powdered polytetrafluoroethylene;
2. A filled vulcanizate according to claim 1 wherein said acid acceptor is selected from the group consisting of magnesium oxide, calcium oxide, strontium oxide, and barium oxide.
3. A vulcanizate according to claim 1 wherein a reinforcing filler selected from the group consisting of lithium fluoride, calcuim fluoride, ferric fluoride, titanium fluoride, silicon oxide and titanium dioxide is included in said vulcanizate.
4. A vulcanizate according to claim 1 wherein said peroxide is selected from the group consisting of dicumyl peroxide, di-t-butyl peroxide, decanoyl peroxide, t-butyl perbenzoate, lauroyl peroxide, methyl ethyl ketone peroxide, and 2,5-dimethyl-2,5-di(t-butylperoxy)hexane.
5. A process for the preparation of filled carboxynitroso-polybutadiene vulcanizates comprising:
 (A) milling a mixture of a terpolymer of 42 to 49.85 mole percent trifluoronitrosomethane, 50 mole percent tetrafluoroethylene, and 0.25 to 8 mole percent nitrosoperfluorobutyric acid with a functionally terminated polybutadiene selected from the group consisting of amino terminated polybutadiene, mercapto terminated polybutadiene, hydroxy terminated polybutadiene, and isocyanate terminated polybutadiene in an amount which is stoichiometric with nitrosoperfluorobutyric acid;
 (B) reacting said acid with said polybutadiene to form an intermediate elastomer;
 (C) adding an alkaline earth salt acid acceptor and powdered polytetrafluoroethylene filler to said elastomer; and
 (D) curing said filled elastomer in the presence of a peroxide free radical initiator.
6. A process according to claim 5 wherein said acid acceptor is selected from the magnesium oxide, calcium oxide, strontium oxide, and barium oxide.

7. A process according to claim 5 wherein said peroxide is selected from the group consisting of dicumyl peroxide, di-butyl peroxide, decanoyl peroxide, t-butyl perbenzoate, lauroyl peroxide, methyl ethyl ketone peroxide, and 2,5-dimethyl-2,5-di(t-butylperoxy) hexane.

8. A process according to claim 5 wherein a reinforcing filler is selected from the group consisting of lithium fluoride, calcium fluoride, ferric fluoride, titanium fluoride, silicon dioxide and titanium dioxide, is added to said elastomer.

9. A vulcanizate according to claim 1 wherein the terpolymer comprises 1 mole percent nitrosoperfluorobutyric acid, 49 mole percent trifluoronitrosomethane, and 50 mole percent tetrafluoroethylene.

10. A process according to claim 5 wherein the terpolymer comprises 1 mole percent nitrosoperfluorobutyric acid, 49 mole percent trifluoronitrosomethane, and 50 mole percent tetrafluoroethylene.

References Cited

UNITED STATES PATENTS

| | | | |
|---|---|---|---|
| 3,282,884 | 11/1966 | Green | 260—92.1 A |
| 3,321,454 | 5/1967 | Crawford, Jr. et al. | 260—92.1 A |
| 3,417,068 | 12/1968 | Knoll | 260—92.1 A |
| 3,427,279 | 2/1969 | Green | 260—41 R |
| 3,554,885 | 1/1971 | Oliver | 260—92.1 A |
| 3,573,267 | 3/1971 | Green | 260—92.1 A |
| 3,223,676 | 12/1965 | Rucker | 260—889 |

MORRIS LIEBMAN, Primary Examiner

S. L. FOX, Assistant Examiner

U.S. Cl. X.R.

260—41.5 A, 91.1 A, 890